United States Patent Office 2,911,421
Patented Nov. 3, 1959

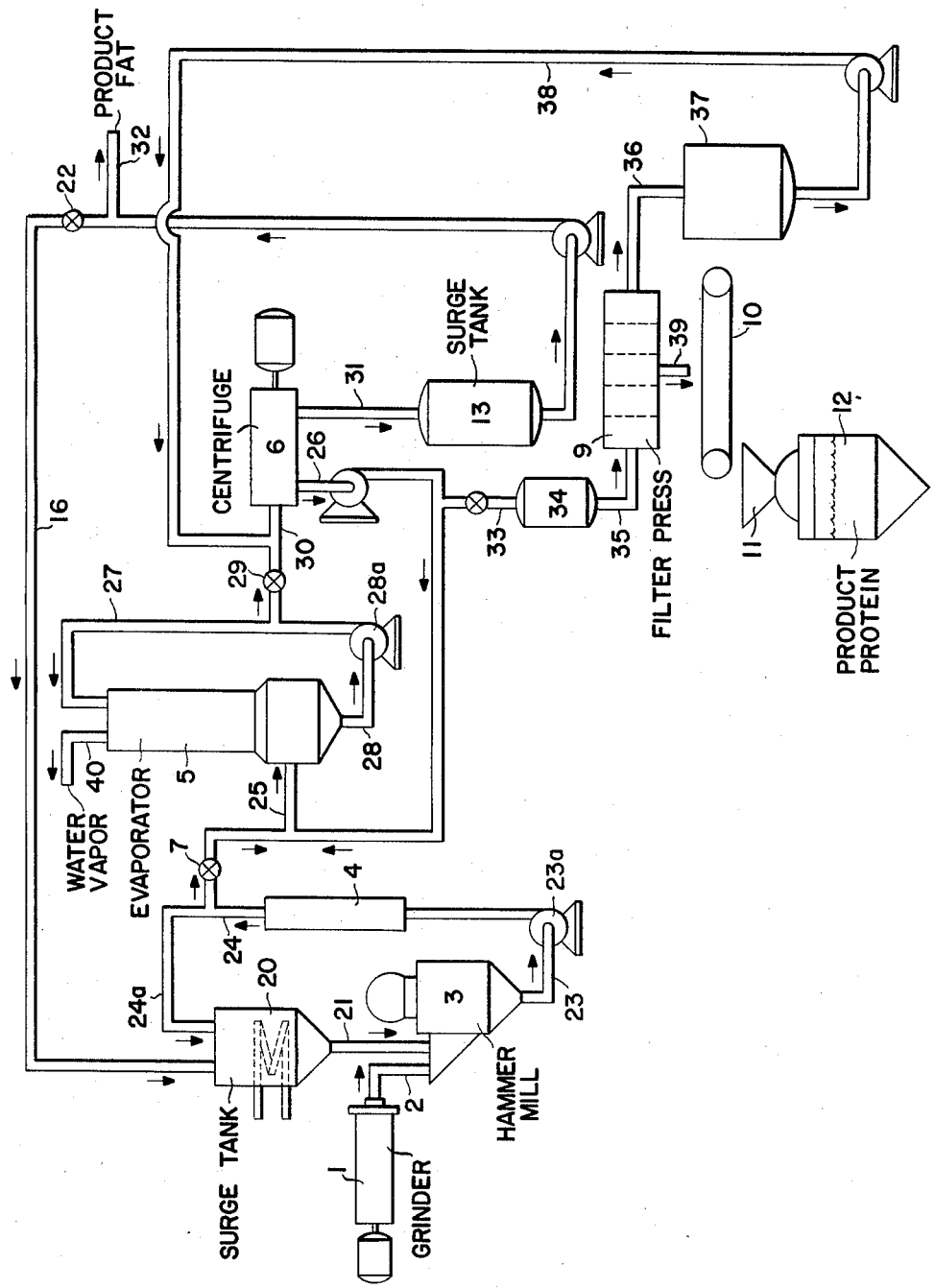

2,911,421

GRINDING AND RENDERING OF FAT CONTAINING TISSUE

Charles Greenfield, Elizabeth, N.J.

Application February 14, 1957, Serial No. 640,278

9 Claims. (Cl. 260—412.6)

This invention relates to improvements in the rendering of fat containing tissue. More particularly it relates to a process wherein tissue of this nature is rendered by finely grinding it and then heating it at subatmospheric pressures and at a temperature above the melting point of the fat but below the coagulation temperature of the protein contained in the tissue.

This application is a continuation-in-part of Serial No. 617,987, filed October 24, 1956.

The rendering of fat containing tissue by the wet or dry processes is well known, e.g., see "The Journal of the American Oil Chemists Society," October 1956, pages 471–473. These processes have in general been characterized by heating at temperatures sufficiently high to coagulate the proteins in order to free the oil from the cellular tissue. These elevated temperatures undesirably affect the quality of the separated oils and in addition the denaturing of the protein quite often adversely affects its value.

This invention provides an improved rendering process which overcomes the beforementioned difficulties. The method comprises first finely grinding the fat containing tissue and then heating the ground tissue at subatmospheric pressure and at a temperature sufficient to melt the fat but below the coagulation temperature of the protein contained in the tissue. The water is substantially all removed as vapor. The liquid fat can then easily be separated from the solids in the resultant slurry or even from the water and solids prior to the evaporation.

Other features of this invention include conducting the grinding operation at the same controlled temperature conditions as the heating step; grinding the tissue in the presence of added fat which is at the same temperature range and whose source can be from the process itself or from extraneous materials and recycling solids separated from the fat to the heating step. The utilization of the "heat pump" principle by utilization of a circulating refrigerant as a heat transfer medium is particularly advantageous to the rendering process. The fat containing tissue is first ground or comminuted by conventional means, e.g., a hammer mill, meat chopper, or fine cutters, so that it passes through holes of $\frac{1}{32}''$ to $\frac{1}{8}''$ diameter in the standard hammer-mill screens or their equivalents.

This grinding preferably takes place in the presence of added fat at a temperature sufficient to melt at least a portion of it but below the protein coagulating temperature. These temperature controls are preferably applied during the grinding step even in the absence of added fat. The melting of the fat facilitates the grinding. The resultant fluid mixture or slurry containing the tough fibrous material is uniformly dispersed over the grinding surface, so that the grinding load is uniformly distributed. In addition the fluid mixture immediately discharges from the screen resulting in a minimum of back pressure. The feed of a liquid mixture to the grinder is readily obtained by simple valve control. Less power is expended by use of the added melted fat.

The addition of fat is first controlled so that the warm fat at e.g. 100° F. to 120° F. will melt the fat of the entering cold material which may be near the freezing point. When such is the case, the quantity of added fat can be ten times or more the quantity of entering feed material. The cold material may be preheated by other means, but it is preferred to provide the maximum heat transfer conditions by blending the warm fat with the entering feed material. When the material is at an elevated temperature such as secured from freshly killed animals, the amount of added fat can be reduced to 2 parts to 5 parts per part of entering feed material. When added fat is used it can be the same fat obtained by the rendering or extraneous fat can be used so as to end up with blends or mixed compositions of different fatty materials.

The heating step is conducted at a temperature sufficient to melt the fat but below the coagulation temperature of the protein, at subatmospheric pressures. This results in the removal of substantially all the water as vapor and the obtaining of a resultant, effectively fluid slurry of ground proteinaceous solids in oil. Conveniently the temperatures employed will thus be in the range of about 90° to 130° F. and the pressure is below about 50 mm. Hg, and is preferably 12 to 25 mm.

The fat containing tissue to which this process is applicable includes the well known animal fat tissues such as beef fat, pig fat, lamb fat, pig fat with skins and animal fats which have been treated with brine.

Additionally it may be desirable to recycle solids obtained by the separation of the oil from the proteinaceous solids back to the heating step which feature is covered more broadly in my copending application, Serial No. 617,987, filed October 24, 1956. In order to accomplish the lower ratios of fat to solids, it is preferred to maintain the concentration of solids with respect to water in the evaporator at approximately about 9:1 as described in the copending application, since the fluidity or absence of gel is greatly improved at these low fat ratios, when the moisture content is sharply reduced from the entering feed. This is particularly true in processing materials such as pork fat tissue containing skins where, at the original moisture content, the material is fairly viscous in spite of the high fat to solids ratio, yet is liquid at a reduced fat to solids ratio but at a higher solids to water concentration. In addition this combination results in a minimum denaturing of the proteins while allowing for very satisfactory fluidity and highest evaporation rate. The net result is a protein product very suitable for gelatin extraction heretofore only produced by an expensive procedure.

In the case of fatty animal tissues containing skin fractions, these products are subject to gel formation. The avoidance of gel formation is secured by having a high concentration of solids to water, such as 90% solids, 10% water.

An additional advantage of adding back solids is to control the concentration of solids to fat in the evaporating zone at a higher concentration than the entering feed. The higher concentration of solids results in a greater evaporation rate of the water contained in the entering material. Sufficient fluidity must be maintained by providing at least 2 parts of fat to 1 part of solids in the evaporation zone.

This invention will be better understood by reference to the following example and flow diagram shown in the drawing.

Referring now to the flow diagram, edible beef having a materials analysis of approximately 80% by weight fat, 5% by weight proteinaceous solids and 15% by weight water are hashed in grinder 1 and then sent through line 2 to hammermill 3 wherein it is comminuted through ⅛″ holes hammermill screen. This grinding is facilitated by the presence of a circulating slurry stream of fat at about its melting point, e.g. 115° to 120° F. which is fed into hammermill 3 from line 21 where pump 23a causes it to flow through heat exchanger 4 to line 24a to surge tank 20. Valve 22 controls the addition of dry fat through line 16, if needed, to maintain the fluid state. The ground fluid and warmed fat containing tissue which is now effectively a fluid slurry is withdrawn through line 24 at a controlled rate equal to the feed rate of the entering cold fat scraps by means of valve 7 and line 25 to ammonia evaporator 5, e.g. "Mojonnier Lo Temp. Evaporator," although Freon or other refrigerant can be used. The entering stream of wet ground material meets a circulating stream of 90 weight percent or higher solids concentration. A fat to solids ratio of approximately 2:1 to 8:1 is maintained in the fluid stream. Because a higher ratio of fat to solids, 16:1, enters the evaporator 5, solids are returned there by returning the solids concentrate from centrifuge 6 and lines 26 and 25. The evaporating unit 5 is maintained at 115° F. to 120° F. and at a pressure of 11 mm. Hg. The main stream passing through evaporator 5 is circulated by pump 28a through line 27 at a rate of approximately 1 to 4 gals./per minute sq. ft. of heat exchanger surface. Substantially all the water vapor is withdrawn through line 40. The slurry withdrawn through line 28 is sent through valve 29 and line 30 to centrifuge 6, although other separating means or thickening can be employed, such as settling or filtering. In centrifuge 6 clear, dry fat is separated and sent through line 31 to surge tank 13. Part of the fat is sent through line 16 if required for use in grinding as a fluidizing medium as explained previously, whereas the clear product fat is withdrawn through line 32. A portion of the proteinaceous solids equal to the solids contained in the feed stream is withdrawn through lines 26 and 33 through vessel 34 and then through line 35 to hydraulic filter press 9, e.g. of the Carver type. Hydraulic pressure is exerted on the solids containing some liquid fat resulting in the separation of the remaining fat containing some fines which is withdrawn through line 36, surge tank 37, and recycled for clarification through lines 38 and 30 to centrifuge 6. The solids in press 9 can be freed of fat to any desired degree, generally to a fat content of less than 8–10%. The solid cakes of protein are discharged through line 39 onto conveyor 10 and then to grinder 11 and storage bin 12.

Pig fat with skins can be effectively processed in the same manner but a greater quantity of solids is made available because of the higher solids content of the skins. An average composition will run approximately 75% fat, 10% non-fat solids and 15% water. The skins are exceptionally rich in collagen, the raw material for gelatin manufacture. By means of this technique a high quality, edible gelatin is made available, because the original raw material has been treated at low temperatures throughout the process with negligible change in protein composition.

Thus an excellent means is provided for processing skins without resorting to the preliminary separation of the fat from the skins with the attendant saving of considerable manual labor.

An additional advantage of the low temperature process is evident in those cases where it may be expedient to render meat scraps at low temperature without subsequent drying such as may be practiced in the extraction for valuable soluble components of the protein residue, after fat separation.

As an example, fat is added to meat scraps in sufficient quantity to form a fluid slurry to facilitate grinding in the range of 90° to 120° F. so that a warm, finely ground fluid mixture results. If this circulating stream is passed through a hammermill of fine screen size, such as ¹⁄₁₆″ holes, a satisfactory product can be produced for processing through centrifugal equipment, resulting in a separation of substantially all of the fat and a residue of proteins and water containing a small portion of fat. The fat may be further clarified by centrifugal treatment or drying.

It is to be noted that if the rendering operations are conducted at 110° F. to 120° F. and at a maximum temperature of 130° F. the protein residue containing other valuable components such as water soluble constituents may be recovered through well known means in very excellent condition.

The evaporation technique is extremely economical and therefore it in itself enhances the commercial utilization of this rendering process.

The utilization of the refrigeration-heat pump cycle results in an extremely low fuel cost equal to ⅓ or ¼ of the usual steam evaporator system. Inasmuch as a temperature of 120° F. and an absolute pressure of 12 to 25 mm. is used during this operation the use of double and triple effect steam evaporator operation becomes impractical because of the need of an elevated temperature beyond that needed to maintain the fluidity of the fat. Recompression of steam vapor at 60° F. to 80° F. to a temperature of 110° to 120° F. is too great a rise in the volume of gas for a mechanical compressor or steam jet compressor to handle to make the operation profitable.

The manufacture of oleo oil from oleo stock and the manufacture of lard oil from rendered lard is simplified by the improved crystallization resulting from the use of low temperature rendering processes. It has been found that improved crystals can be formed in short time periods, as well as the additional benefits of increasing the yields of oil and speeding up of the filtration cycle. The hard cakes of stearine contain a minimum of occluded oil thereby the value of this product is considerably improved.

For example, edible grade pork-fat backs were finely ground through screens of a hammermill containing ¹⁄₁₆″ diameter holes, thereafter heated under vacuum at 15 mm. in a "Mojonnier" ammonia evaporator at 112° F. The clear, almost water white fat was separated from the solids by means of a Carver filter press. The fat was then crystallized by cooling from 115° F. to 60° F. in approximately 12 hours and thereafter vacuum filtered at 65° F. A yield of 65% lard oil was obtained. The residue was a semi-waxy material. The filtration rate was exceptionally rapid, since the filtration was accomplished in a few minutes.

A conventional rendered lard processed at 180° F. required 40 hours for cooling and filtration time was approximately an hour. The finished oil was obtained at a lower yield of approximately 55% at 65° F. and the stearine contained a large amount of occluded oil.

The advantages of this invention are quite numerous. The superior quality of the proteins obtained by avoiding denaturing have been previously mentioned. Normally difficult to render tissue can be treated by this process. The proteins recovered additionally are of a fibrous nature because of the low temperature grinding and drying operation, compared to the powdery, hard form of material resulting from the use of higher temperatures. The fibrous material has utility as a filter aid, e.g. for clarifying the dry oil rendered from the raw materials. The oil is of exceptionally high grade and is obtained in yields of almost 100%. The evaporation technique and the conditions used are extremely economical. The fluid slurry grinding greatly facilitates this operation. In substance, an efficient, continuous rendering has been developed which heretofore had not been considered practical.

It is to be understood that this invention is not limited to the specific examples which have been offered merely as illustrations and that modifications may be made without departing from the spirit of the invention.

What is claimed is:

1. A method of rendering animal fat containing proteinaceous tissue which comprises the steps of finely grinding the tissue to a maximum cross section diameter of ⅛ inch in the presence of added fat at a temperature sufficient to melt at least a portion of it but below the coagulation temperature of the protein; heating the ground tissue at subatmospheric pressure and at a temperature sufficient to melt the fat but below the coagulation temperature of the protein contained in the tissue; removing substantially all the water present as vapor and separating the liquid fat from the solids in the resultant fluid slurry.

2. The process of claim 1 wherein the temperatures employed in the grinding and heating steps are in the range of 90° F. to 130° F.

3. The process of claim 1 in which the heating step is conducted at a maximum pressure of 50 mm. Hg.

4. The process of claim 3 in which the added fat is recycled from the separation step.

5. The process of claim 3 including the additional step of recycling solids from the separation step to the heating step.

6. A continuous method of rendering animal fat containing proteinaceous tissue which comprises the steps of finely grinding the tissue in the presence of a circulating slurry stream of melted fat; heating the ground tissue at subatmospheric pressure and at a temperature sufficient to melt the fat but below the coagulation temperature of the protein contained in the tissue; removing substantially all the water present as vapor and separating the liquid fat from the solids in the resultant fluid slurry.

7. The process of claim 6 in which the heat source for the heating step is a vaporizable liquid refrigerant and the refrigerant transfers heat to the ground tissue by means of a heat transfer surface, thereby evaporating water from the ground tissue, resulting in the condensation of the refrigerant vapor; the liquid refrigerant condensate is then expanded to a lower pressure where it is used as a cooling medium across a heat transfer surface resulting in the condensation of the vaporized water and the vaporization of the refrigerant, then increasing the pressure on the refrigerant vapors for reuse in the heating step.

8. The process of claim 7 wherein the refrigerant is ammonia.

9. A continuous method of rendering animal fat containing proteinaceous tissue which comprises the steps of finely grinding the tissue in the presence of added fat at a temperature sufficient to melt at least a portion of it but below the coagulation temperature of the protein; heating the ground tissue at subatmospheric pressure and at a temperature sufficient to melt the fat but below the coagulation temperature of the protein contained in the tissue; removing substantially all the water present as vapor and separating the liquid fat from the solids in the resultant fluid slurry.

References Cited in the file of this patent

UNITED STATES PATENTS

| | | |
|---|---|---|
| 1,966,181 | Lowry | July 10, 1934 |
| 2,467,529 | Hormel | Apr. 19, 1949 |
| 2,671,098 | Pavio | Mar. 2, 1954 |
| 2,745,856 | Dayen et al. | May 15, 1956 |
| 2,823,215 | Downing | Feb. 11, 1958 |

OTHER REFERENCES

Bailey: "Industrial Oil and Fat Products," 2nd ed., Interscience Pub., Inc., New York (1951), page 873.